(12) United States Patent
Grooters

(10) Patent No.: US 7,779,441 B2
(45) Date of Patent: *Aug. 17, 2010

(54) ELECTRONIC PROGRAM GUIDE INCLUDING LIVE NETWORK MULTIMEDIA BROADCAST CHANNELS

(75) Inventor: Brandon A. Grooters, Watauga, TX (US)

(73) Assignee: Gateway, Inc., N. Sioux City, SD (US)

( * ) Notice: Subject to any disclaimer, the term of this patent is extended or adjusted under 35 U.S.C. 154(b) by 889 days.

This patent is subject to a terminal disclaimer.

(21) Appl. No.: 10/764,804

(22) Filed: Jan. 26, 2004

(65) Prior Publication Data

US 2004/0158856 A1    Aug. 12, 2004

Related U.S. Application Data

(63) Continuation of application No. 09/397,908, filed on Sep. 17, 1999, now Pat. No. 6,684,399.

(51) Int. Cl.
*G06F 3/00* (2006.01)

(52) U.S. Cl. .............................. 725/48; 725/53; 725/59

(58) Field of Classification Search .................. 725/48, 725/51, 49, 112, 59
See application file for complete search history.

(56) References Cited

U.S. PATENT DOCUMENTS

| | | | | |
|---|---|---|---|---|
| 5,801,787 A * | 9/1998 | Schein et al. | ................. | 725/43 |
| 6,169,543 B1 * | 1/2001 | Wehmeyer | ................... | 725/47 |
| 6,177,931 B1 * | 1/2001 | Alexander et al. | ............ | 725/52 |
| 6,215,483 B1 * | 4/2001 | Zigmond | ..................... | 725/112 |
| 6,397,387 B1 * | 5/2002 | Rosin et al. | .................... | 725/44 |
| 6,564,379 B1 * | 5/2003 | Knudson et al. | ............. | 725/42 |
| 6,631,523 B1 * | 10/2003 | Matthews et al. | ............. | 725/53 |
| 6,772,433 B1 * | 8/2004 | LaJoie et al. | .................. | 725/52 |
| 7,395,514 B2 * | 7/2008 | Stern | .......................... | 715/854 |
| 2001/0012024 A1 * | 8/2001 | Rosin et al. | ................. | 345/841 |
| 2003/0020744 A1 * | 1/2003 | Ellis et al. | .................... | 345/723 |
| 2005/0028208 A1 * | 2/2005 | Ellis et al. | ..................... | 725/58 |
| 2005/0216936 A1 * | 9/2005 | Knudson et al. | ............. | 725/42 |

* cited by examiner

*Primary Examiner*—Brian T. Pendleton
*Assistant Examiner*—Olugbenga Idowu
(74) *Attorney, Agent, or Firm*—WPAT, P.C.; Anthony King

(57) ABSTRACT

An electronic program guide system and a method for generating an electronic program guide are disclosed. A first information handling system obtains programming information from a program information source and generates a program guide based upon the obtained program information. A second information handling system receives the program from the first information handling system via downloading or transmission. The first information handling system searches a worldwide network for information regarding a transitory broadcast event and incorporates the transitory event information into the generated program guide prior to transmitting the program guide to the second information handling system. The transitory broadcast event information may be added to the program guide as additional, temporary channels that include links to the nodes from which the transitory broadcast event may be obtained. The program guide is thereby augmented with the additional, transitory broadcast event information.

27 Claims, 4 Drawing Sheets

| TUE AM | | 9:30 | 10:00 | 10:30 | 11:00 |
|---|---|---|---|---|---|
| SPR | 002 | TODAY'S ATHLETE | SCOUTING REPORT | BASKETBALL REVIEW | IN DEPTH DIVING |
| HOM | 005 | MR. DO IT YOURSELF | COOKING | FENCE BUILDING | DECORATING |
| LNX | 006 | BOB & TED SHOW | CLASSIC THEATER | OCEAN WORLD | MARTHA MAPLE |
| CNR | 013 | TODAY'S ECONOMY | STOCK REPORT | TOMORROW'S ECONOMY | WORLD ECONOMIC REPORT |
| WST | 017 | WIN A FORTUNE | JERRY PRINTEMPSEUR | OLD MACDONALD | OUR LIFE IN THIS WORLD |
| TEMP | 901 | | LIVE: SPACE SHUTTLE LAUNCH COVERAGE HTTP://WWW.NASA.GOV/SHUTTLE/COVERAGE.VID | | |
| TEMP | 902 | | LIVE: TECHNOCON USA COMPUTER EXPO HTTP://WWW.TECHNOCON.ORG/COMP/EXPO.MMP | | |
| TEMP | 903 | PRERECORDED: LONDON SYMPHONY ORCHESTRA HTTP://WWW.CONCERTS.COM/CLASSICAL/LSO.MMP | | | |

| TUE AM | 9:30 | 10:00 | 10:30 | 11:00 |
|---|---|---|---|---|
| SPR 002 | TODAY'S ATHLETE | SCOUTING REPORT | BASKETBALL REVIEW | IN DEPTH DIVING |
| HOM 005 | MR. DO IT YOURSELF | COOKING | FENCE BUILDING | DECORATING |
| LNX 006 | BOB & TED SHOW | CLASSIC THEATER | OCEAN WORLD | MARTHA MAPLE |
| CNR 013 | TODAY'S ECONOMY | STOCK REPORT | TOMORROW'S ECONOMY | WORLD ECONOMIC REPORT |
| WST 017 | WIN A FORTUNE | JERRY PRINTEMPSEUR | OLD MACDONALD | OUR LIFE IN THIS WORLD |
| TEMP 901 | | LIVE: SPACE SHUTTLE LAUNCH COVERAGE HTTP://WWW.NASA.GOV/SHUTTLE/COVERAGE.VID | | |
| TEMP 902 | | LIVE: TECHNOCON USA COMPUTER EXPO HTTP://WWW.TECHNOCON.ORG/COMP/EXPO.MMP | | |
| TEMP 903 | PRERECORDED: LONDON SYMPHONY ORCHESTRA HTTP://WWW.CONCERTS.COM/CLASSICAL/LSO.MMP | | | |

FIG. 4

ELECTRONIC PROGRAM GUIDE INCLUDING LIVE NETWORK MULTIMEDIA BROADCAST CHANNELS

CROSS REFERENCE TO RELATED APPLICATIONS

The present application is a Continuation of U.S. patent application Ser. No. 09/397,908 filed Sep. 17, 1999 and now issued as U.S. Pat. No. 6,684,399. Said U.S. Pat. No. 6,684,399 is hereby incorporated by reference.

FIELD OF THE INVENTION

The present invention generally relates to the field of information handling systems, and particularly to an electronic program guide utilized by an information handling system.

It is often desirable to provide a program guide in an electronic format that provides programming information such as broadcast or cable television programming schedules for regularly scheduled programs and events. The electronic program guide (or EPG) may be compiled by a service provider and delivered to the user via electronic transmissions systems. The electronic program guide is then displayable on an information handling system such that the user may view the programming information to decide which programs to watch and at what times to watch them.

One disadvantage of the traditional electronic program guide is that it typically only includes programming content provided by long established airwave television, cable television or satellite television programming sources. In other words, the number of channels or stations included in the program guide is a fixed number based upon the number of available channels in the user's local geographic region. Often, however, single, transitory events such as a press conference, space vehicle launch, concert, telethon, governmental hearing, etc. will be scheduled to occur and be broadcast over alternative transmission media, and that do not fit into regularly scheduled programming. The alternative transmission medium may be a worldwide network such as the Internet that allows a user to couple to a node of the network far outside of his or her geographical region and time zone and from which the single, transitory event may be broadcast and transmitted to the user via the worldwide network. It would be highly desirable to determine when such transitory broadcasts are scheduled to occur, to determine via which nodes of the network the broadcasts will be available, and to include such information in the electronic program guide. Further, since such broadcast events are transitory in nature, it would be highly desirable to provide the broadcast scheduling information as flexible, temporal channels rather than as fixed, long established static channels of traditional broadcast content sources.

SUMMARY OF THE INVENTION

The present invention is directed to an electronic program guide system. In one embodiment, the electronic program guide system includes a first information handling system for obtaining programming information from a program information source and generating a program guide based upon the obtained program information, and a second information handling system coupled to the first information handling system, for receiving the program guide by causing the first information handling system to transmit the program guide to the second information handling system. The first information handling system is configured to search a worldwide network for information regarding a transitory broadcast event and to incorporate the transitory event information into the generated program guide prior to transmitting the program guide to the second information handling system.

The present invention is further directed to a method for generating an electronic program guide. In one embodiment, the method includes steps for obtaining program guide information from a program information source, generating a program guide based upon the obtained program guide information, searching a network for information regarding a transitory broadcast event, determining whether a node on the network contains multimedia content, in the event it is determined that the node does not contain multimedia content, continuing with the searching step, otherwise, obtaining multimedia content information stored in the node, determining from the multimedia content information whether the multimedia content is live content, in the event it is determined that the multimedia content is live content, adding the multimedia content information to the program guide, in the event it is determined that the multimedia content is not live content, determining whether the multimedia content is a scheduled live broadcast, in the event it is determined that the multimedia content is a scheduled live broadcast, executing the step for adding the multimedia content information to the program guide, and otherwise continuing with the searching step.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which:

FIG. 4 is a diagrammatic illustration of an electronic program guide in accordance with the present invention.

DETAILED DESCRIPTION OF THE INVENTION

Reference will now be made in detail to the presently preferred embodiment of the invention, an example of which is illustrated in the accompanying drawings.

Figure 1:
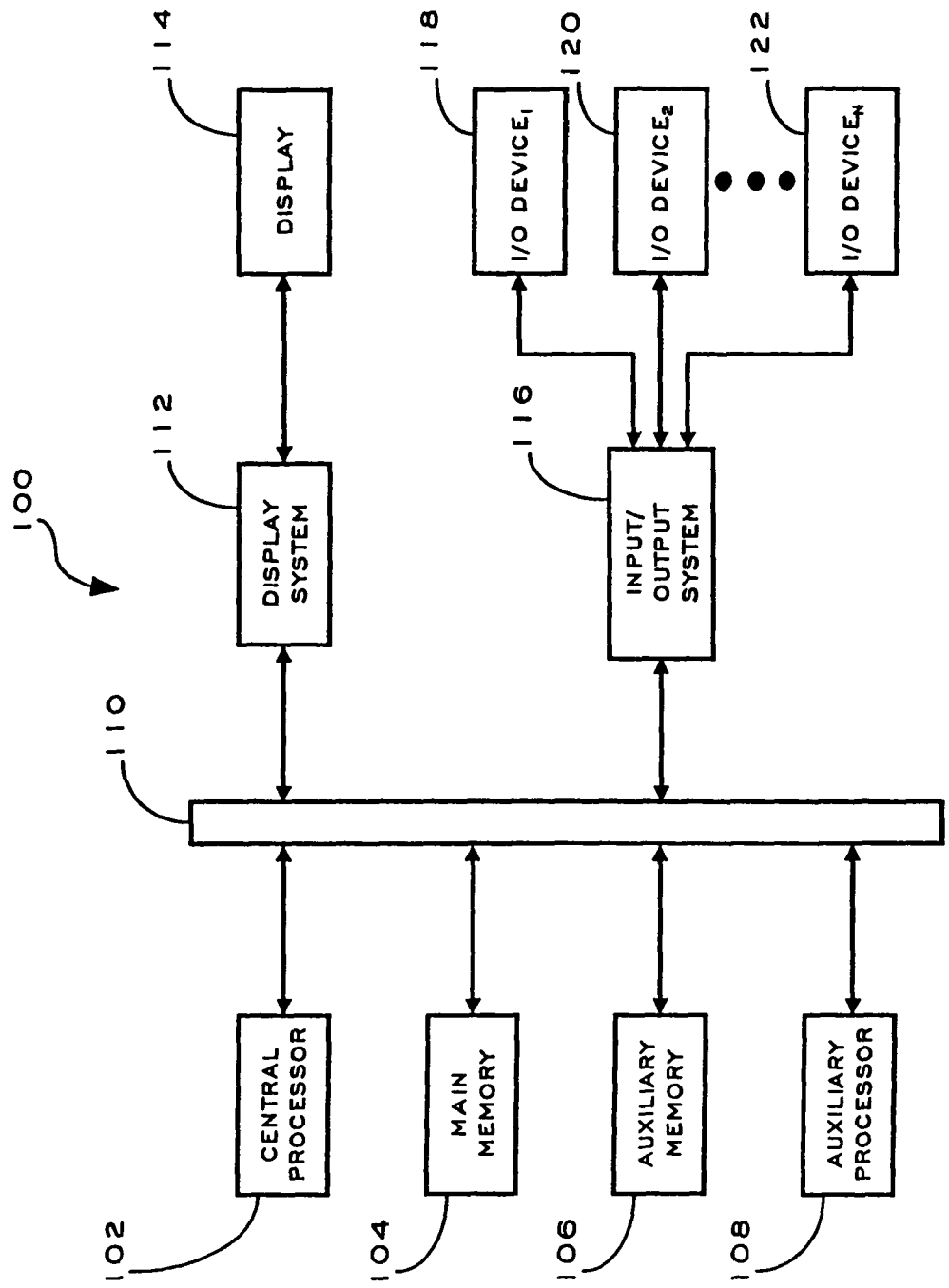
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processor 102 controls the information handling system 100. Central processor 102 includes a central processing unit such as a microprocessor or microcontroller for executing programs, performing data manipulations and controlling the tasks of information handling system 100. Communication with central processor 102 is implemented through a system bus 110 for transferring information among the components of information handling system 100. Bus 110 may include a data channel for facilitating information transfer between storage and other peripheral components of information handling system 100. Bus 110 further provides the set of signals required for communication with central processor 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 110 may be compliant with any promulgated industry standard. For example, bus 110 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of information handling system 100 include main memory 104, auxiliary memory 106, and an auxiliary processor 108 as required. Main memory 104 provides storage of instructions and data for programs executing on central processor 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Information handling system 100 may optionally include an auxiliary processor 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Information handling system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118-122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118-122 may provide or receive analog or digital signals for communication between information handling system 100 of the present invention and external devices, networks, or information sources. Input/output system 116 and I/O devices 118-122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of information handling system 100 of FIG. 1 by one having ordinary skill in the art would not depart from the scope or the spirit of the present invention.

Figure 2:
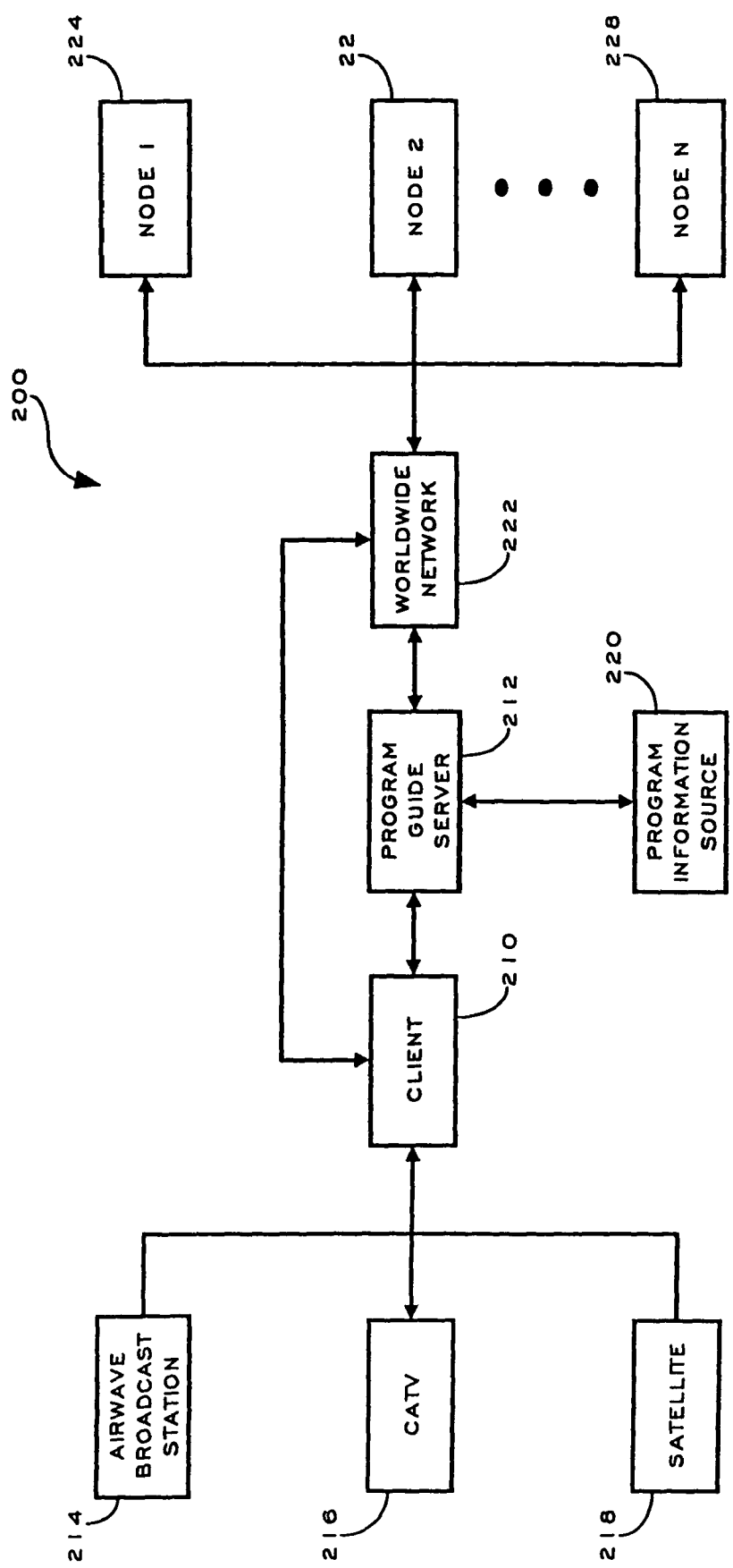
FIG. 2 is a block diagram of a program guide client-server system in accordance with the present invention.

Referring now to FIG. 2, a block diagram of program guide client-server system in accordance with the present invention will be discussed. The program guide system 200 includes a client system 210 and a program guide server system 212. Client 210 and program guide server 212 may be an information handling system 100 as shown in FIG. 1, however, depending upon the requirements of the intended application, not all of the hardware devices need be included or identical as information handling system 100. For example, client 210 may not require auxiliary processor 108. Program guide server 212 and client 210 preferably, but not necessarily, implement a client-server based architecture wherein the execution of a program of instructions may occur on either client, 210, server 212, or on both client 210 and server 212. Client 210 couples with program guide server 212 for obtaining programming information in the form of an electronic program guide. The program guide may be obtained and processed by program guide server 212 from an appropriate program information source 220 and stored in an information storage medium coupled to program guide server 212. At an appropriate time upon a request by client 210, program guide server may download the program guide to client 210 that is in turn stored in an information storage medium coupled to client 210. As shown in FIG. 1 client 210 may be configured to receive the program guide from program guide server 212, may be configured to receive programming content from airwave broadcast station 214, cable television provider 216, and satellite television provider 218, and further may be configured to receive content from worldwide network 222. However, it is not necessary that a single device (e.g., client 210) perform all of the aforementioned functions. For example, client 210 may be in information handling system that couples to program guide server 212 to obtain program guide information that may be displayed on a standard television device separate from client 210 wherein the television device receives the program broadcast from airwave broadcast station 214. Further, a second information handling system may couple to worldwide network 222 to receive and display a multimedia network program. It is preferable, however to provide a single device (e.g., client 210) that is capable of providing all functions described herein. A suitable single device may be, for example, a personal computer and television (PC-TV) convergence device.

Client 210 may be capable of receiving program content from one or more sources. For example, client 210 may include a television tuner as an I/O device for receiving programming from a local airwave broadcast station 214. The programming received from airwave broadcast station 214 may be an analog signal (e.g., being compliant with a National Television Standards Committee or "NTSC" standard) or digital signal (e.g., being compliant with a high-definition television or "HDTV" standard). Client 210 may also receive a cable television signal from a cable television provider 216 by utilizing an appropriate cable television receiver, or may receive a satellite television signal from a satellite television provider 218 by utilizing an appropriate satellite television receiver and antenna. Furthermore, client 210 may include appropriate hardware for coupling to a worldwide network 222 such as the Internet. Worldwide network 222 may include at least one or more nodes 224 and 226, up to N number of nodes 228, comprising information handling systems similar to information handling system 100 on which programming content may be stored or through which programming content may be delivered and accessible to client 210 via worldwide network 222. For example, one of nodes 224-228 may belong to the National Aeronautics and Space Administration (NASA) who may provide live video coverage of the launch of a space vehicle (e.g., the space shuttle) over worldwide network 222 to client 210. Program information source 220 may include one or several sources of programming information. For example, program information source 220 may include an information handling system of a local or national television network that makes programming information available to program guide server 212 for future programs to be broadcast, for example, by airwave broadcast station 214, cable television station 216 or satellite television provider 218.

Figure 3:
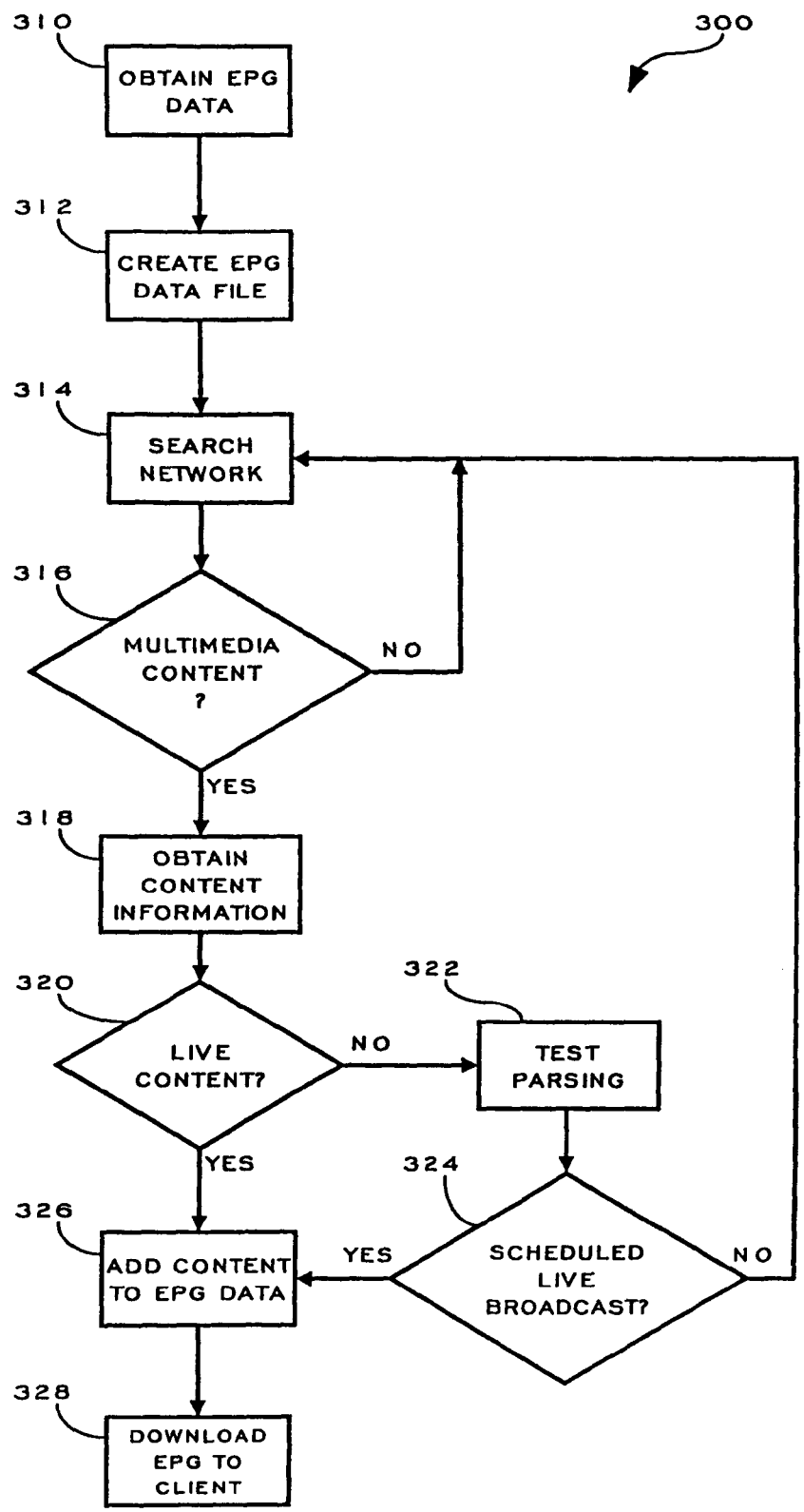
FIG. 3 is a flow diagram of a method for generating an electronic program guide in accordance with the present invention.

Referring now to FIG. 3, a flow diagram of a method for generating an electronic program guide in accordance with the present invention will be discussed. The method 300 initiates with program guide server 212 obtaining program guide data at step 310. Program guide server 212 may obtain programming information from program information source 220, for example. Program guide server 212 creates a program guide data file at step 312 for a given period of time based upon the obtained programming information. A network such as worldwide network 222 is searched at step 314 for multimedia content that may exist on or be accessible via a selected one or more of nodes 224-228. The selection or a particular one of nodes 224-228 may be based upon user preferences, user viewing or network browsing history, a meta tag search, etc. A meta tag is information stored in a hypertext markup language (HTML) document that provides information about the contents of the HTML document, including keywords and indexing information, utilized by a networking information searching program, or search engine, to locate nodes (e.g., nodes 224-228) at which desired information may be stored. A suitable search engine may be embodied as a program of instructions executed by program guide server 2121. A determination is made at step 316 whether multimedia content is stored on or is accessible via the selected node. In the event that no multimedia content is determined to exist on or be accessible via the selected node, the network is continued to be searched at step 314. In the event that multimedia content is determined to exist on or be accessible via the selected node, content information regarding the multimedia information is obtained at step 318. A determination is made at step 320 whether the multimedia content contains or is live content. In the event the multimedia content is determined to be live content, the content data is added to the program guide data at step 326, for example as an additional temporary channel of the program guide. In the event the multimedia content is not determined to be live content, a test parsing routine is executed at step 322 in which the content information is broken down and analyzed. A determination is made at step 324 whether the content information refers to a scheduled live broadcast event available over the network, for example, an event to be broadcast via worldwide network 222. In the event it is determined that the content information does not refer to a scheduled live broadcast event, the network is continued to be searched at step 314. In the event it is determined that the content information refers to a scheduled live broadcast event, the content information is added to the program guide data at step 326, for example as an additional channel. The program guide may thereby be supplemented with information regarding live content and scheduled future live broadcast content. The supplemented program guide may then be delivered to client 210 at step 328.

The method described with respect to FIG. 3 may be embodied as a program of instructions executing on program guide server 212 by configuring program guide server 212 to execute the steps of the method. The program of instructions may include instructions for causing program guide server to perform meta tag based searches of hypertext markup language (HTML) documents or the like stored on worldwide network 222 to locate multimedia broadcast content or broadcast information. If multimedia content information is found, the contents of the HTML document are analyzed by a set of instructions causing program guide server 212 to execute a parsing routing (step 322) that tests the content information for key text and hyperlinks. For example, in a hyperlink to a multimedia file, an extension of the hyperlink may indicate the contents of the file as being multimedia formatted content. One example of such multimedia format is for a REALAUDIO, REALVIDEO or REALPLAYER multimedia player available from REAL NETWORKS, Inc., in which the HTML tag "HREF="../../radiorijeka/live.ram" wherein the "live" extension indicates a live broadcast of information and the "ram" extension indicates the information is formatted in a REALAUDIO multimedia format, thereby indicating a live multimedia broadcast. The format and structure of the uniform resource locators (URLs) such as the above described HTML tag describing multimedia content may be predetermined and known to the program of instructions (e.g., stored in a list). Broadcast information may be live or may be prerecorded. Typically, the broadcast protocols contain meta information describing the nature of the broadcast (e.g., live or recorded) that may be used by program guide server 212 to determine (step 324) whether or not to include the multimedia broadcast information with the electronic program guide (step 326) as an augmented, temporary channel. Additional information may be parsed from text surrounding an HTML tag such as a token in the information representing time, scheduling, etc. Program guide server 212 generates new electronic program guide content by inserting the multimedia information into the preexisting program guide data. The augmented electronic program guide may then be delivered to client 210 (step 328).

Referring now to FIG. 4, a diagrammatic illustration of an electronic program guide in accordance with the present invention will be discussed. The program guide 400 includes programming information 410 for regular program broadcasts, and further provides programming information 412 for temporary, transient programming events. Regular programming 410 may be, for example, for established media channels 414 that typically provide programming content via airwave broadcast station 214, cable television provider 216, satellite television provider 218, etc. Regular programming 410 provided by established channels 414 are generally associated with permanent channel or station numbers 416 that are utilized to reference a particular television frequency band. When program guide server finds live or scheduled multimedia content on a node 224-228 of worldwide network 222, a temporary channel 418 is created in program guide 400 for providing the time at which the temporary programming will occur or be available. The uniform resource locator (URL) 420 of the location of the multimedia content may be provided in program guide so a user of client 210 will know the location of the multimedia content. Additionally, temporary channel 418 may be associated with URL 420 such that the user would merely have to tune a receiver to the associated channel, and, upon so tuning, client 210 automatically couples to the correct source or node via which the multimedia content is available. For example, when the user tunes to temporary channel 901 as shown in FIG. 4, client 210 automatically couples to the node at through which the space shuttle launch coverage is available via a NASA node. Temporary channels 418 may be assigned to unutilized channels of the receiver, and, if necessary, mapped to virtual channels indicating the channel as being temporary. For example, channels 3, 4 and 7 may be unused in a particular geographic region. These channels may be mapped to virtual channels 901, 902, and 903, respectively, wherein the digit "9" indicates the channels are temporary channels. When the program guide is generated for succeeding time periods, temporary channels may be added or removed from program guide 400 in accordance with the presence or absence, increase or reduction in temporary multimedia content broadcasts. For example, if no multimedia content broadcast existed for a given time period, program guide 400 would not include in temporary channels. Likewise, if more multimedia broadcast events are scheduled in a given time period, program guide 400 would correspondingly have more temporary channels for that time period.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the electronic program guide including live network multimedia broadcast channels of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An electronic program guide system, comprising:
a first information handling system for obtaining programming information from a program information source and generating a program guide based upon the obtained program information;
a second information handling system coupled to said first information handling system, for receiving the program guide by causing said first information handling system to transmit the program guide to said second information handling system; and
said first information handling system being configured to search a worldwide network for information regarding a transitory broadcast event and to incorporate the transitory event information into the generated program guide prior to transmitting the program guide to said second information handling system, said transitory broadcast event being a scheduled live broadcast event;
wherein the program guide has a predetermined number of established program channels, said first information handling system being configured to add the information regarding the transitory broadcast event on the worldwide network as a temporary channel created in addition to the predetermined number of established program channels in the program guide.

2. An electronic program guide system as claimed in claim 1, said first and second information handling systems being configured to operate as a client and server system, said first information handling system being a server and said second information handling system being a client.

3. An electronic program guide system as claimed in claim 1, the worldwide network being the Internet.

4. An electronic program guide as claimed in claim 1, wherein first information handling system is configured to search said worldwide network according to a list of parameters.

5. An electronic program guide as claimed in claim 4, wherein said list of parameters includes a predetermined list of nodes.

6. An electronic program guide system as claimed in claim 1, said second information handling system being configured to receive a broadcast of the transitory broadcast event via the worldwide network.

7. An electronic program guide system as claimed in claim 1, said first information handling system being configured to create the temporary channel in the electronic program guide in response to detecting said transitory event information.

8. An electronic program guide system, comprising:
means for obtaining programming information from a program information source and generating a program guide based upon the obtained program information;
means, coupled to said obtaining means, for receiving the program guide by causing said obtaining means to transmit the program guide to said receiving means; and
said obtaining means being configured to search a worldwide network for information regarding a transitory broadcast event and to incorporate the transitory event information into the generated program guide prior to transmitting the program guide to said second information handling system, said transitory broadcast event being a scheduled live broadcast event;
wherein the program guide has a predetermined number of established program channels, said obtaining means being configured to add the information regarding the transitory broadcast event on the worldwide network as a temporary channel created in addition to the predetermined number of established program channels in the program guide.

9. An electronic program guide system as claimed in claim 8, said obtaining means and said receiving means being configured to operate as a client and server system, said obtaining means being a server and said receiving means being a client.

10. An electronic program guide system as claimed in claim 8, the worldwide network being the Internet.

11. An electronic program guide as claimed in claim 8, wherein said obtaining means is configured to search said worldwide network according to a list of parameters.

12. An electronic program guide as claimed in claim 11, wherein said list of parameters includes a predetermined list of nodes.

13. An electronic program guide system as claimed in claim 8, said receiving means being configured to receive a broadcast of the transitory broadcast event via the worldwide network.

14. An electronic program guide system as claimed in claim 8, said obtaining means being configured to create the temporary channel in the electronic program guide in response to detecting said transitory event information.

15. An electronic program guide system as claimed in claim 1, wherein the program guide is generated with the programming information for a plurality of channels, said transitory event information being incorporated into the generated program guide by adding an augmented temporary channel to the plurality of channels.

16. An electronic program guide system as claimed in claim 15, wherein the augmented temporary channel is removed from the program guide upon completion of the transitory broadcast event.

17. An electronic program guide system as claimed in claim 8, wherein the program guide is generated with the programming information for a plurality of channels, said transitory event information being incorporated into the generated program guide by adding an augmented temporary channel to the plurality of channels.

18. An electronic program guide system as claimed in claim 17, wherein the augmented temporary channel is removed from the program guide upon completion of the transitory broadcast event.

19. An electronic program guide system as claimed in claim 1, wherein said temporary channel is removed from the program guide after the transitory broadcast event ends.

20. An electronic program guide system as claimed in claim 8, wherein said temporary channel is removed from the program guide after the transitory broadcast event ends.

21. An electronic program guide system as claimed in claim 8, wherein said temporary channel is removed from the program guide after the scheduled live broadcast event ends.

22. An electronic program guide system as claimed in claim 1, wherein said predetermined number of established program channels are associated with a first source of content selected from a group consisting of cable television content, satellite television content, and airwave broadcast television content, the temporary channel being associated with a second source of content different from the first source of content.

23. An electronic program guide system as claimed in claim 22, wherein the second source of content is the Internet.

24. An electronic program guide system as claimed in claim 8, wherein said predetermined number of established program channels are associated with a first source of content selected from a group consisting of cable television content, satellite television content, and airwave broadcast television content, the temporary channel being associated with a second source of content different from the first source of content.

25. An electronic program guide system as claimed in claim 24, wherein the second source of content is the Internet.

26. An electronic program guide system as claimed in claim 1, wherein said programming information from the program information source comprises information about regular programming airing on established media channels, and wherein said programming information from the program information source does not include information regarding said transitory broadcast event.

27. An electronic program guide system as claimed in claim 8, wherein said programming information from the program information source comprises information about regular programming airing on established media channels, and wherein said programming information from the program information source does not include information regarding said transitory broadcast event.

* * * * *